INVENTOR
ALFRED N. ROGERS
BY
AGENT.

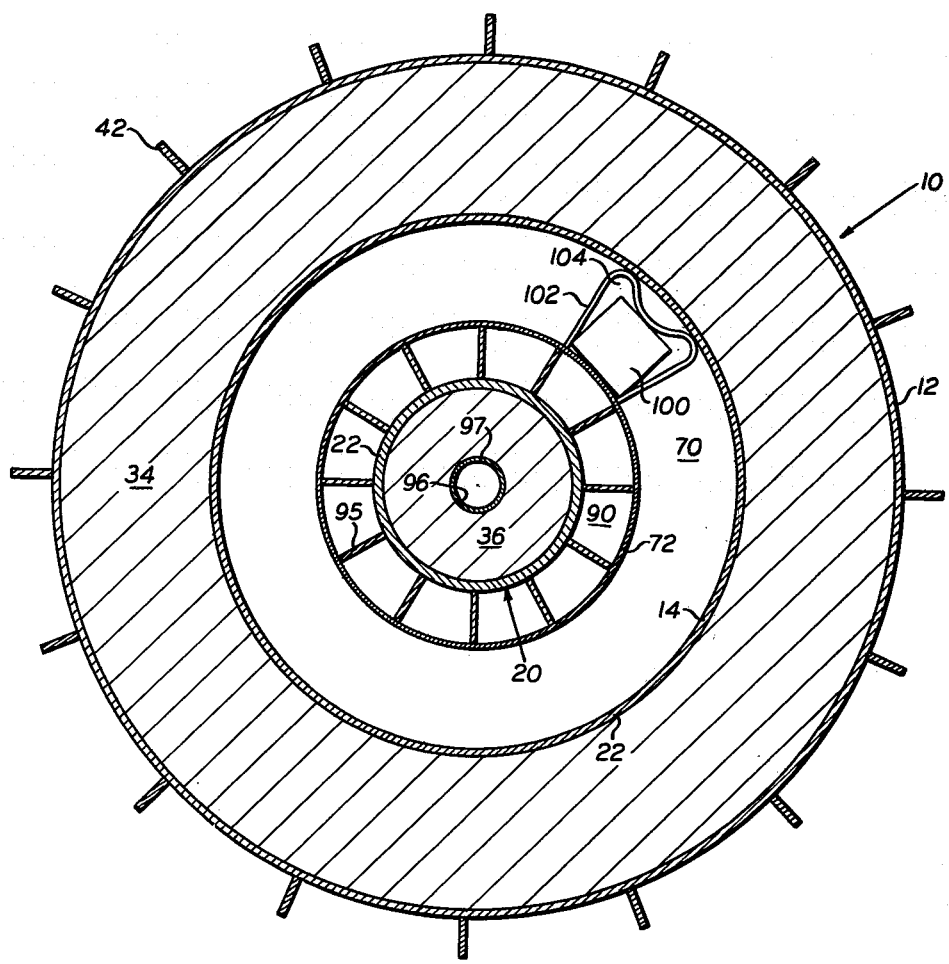

United States Patent Office 3,111,586
Patented Nov. 19, 1963

3,111,586
AIR-COOLED SHIPPING CONTAINER FOR NUCLEAR FUEL ELEMENTS
Alfred N. Rogers, Broomall, Pa., assignor to Baldwin-Lima-Hamilton Corporation, a corporation of Pennsylvania
Filed Aug. 25, 1961, Ser. No. 133,994
10 Claims. (Cl. 250—108)

My invention relates to shipping containers for nuclear fuel elements, and more particularly to upright or vertically disposed shipping containers for spent fuel elements.

When shipping spent elements removed from a nuclear reactor, it is necessary to provide cooling means to dissipate decay heat developed by such elements. Liquid is normally used as the cooling medium but various difficulties are encountered. If a part or all of the liquid is lost, it must be replenished without delay to avoid the danger of overheating. Weight of the liquid, piping and other required accessories will substantially reduce the useful load since generally the allowable gross shipping weight is limited. In the case of forced circulation of the coolant, moreover, it is necessary to provide a pump or the like as well as driving means therefor, which adds to the weight of the equipment, is cumbersome during shipping and subject to failure. In view of the low safety factor of such cooling systems, it is the conventional procedure to ship spent fuel elements immersed in water to avoid immediate overheating in case the cooling device ceases to function properly.

It is an object of the invention to provide an improved shipping container for nuclear fuel elements, which is equipped with simple cooling means and has a relatively low tare weight.

It is also an object of the invention to provide an improved shipping container for nuclear fuel elements, which requires no moving parts or driving means and practically no maintenance for its cooling equipment.

It is another object of the invention to equip a shipping container for spent nuclear fuel elements with a simple air cooling system having a high safety factor so that the elements need not be immersed in water during transport.

It is a further object of the invention to utilize a chimney effect and natural convection flow for cooling a shipping container for spent nuclear fuel elements.

It is a still further object of the invention to provide a shipping container for spent nuclear fuel elements, which though passages are arranged therein for air circulation has simple and effective means for avoiding air contamination as well as direct radiation from the fuel elements to areas outside the container.

Further objects, features and advantages of the invention will become apparent as the description proceeds.

In the drawings which illustrate an embodiment of my invention by way of example, FIG. 1 is an elevational view of a shipping container according to the invention;

FIG. 3 is a cross section taken on line 3—3 of FIG. 2;

FIG. 4 is a cross section taken on line 4—4 of FIG. 2.

Figure 1:
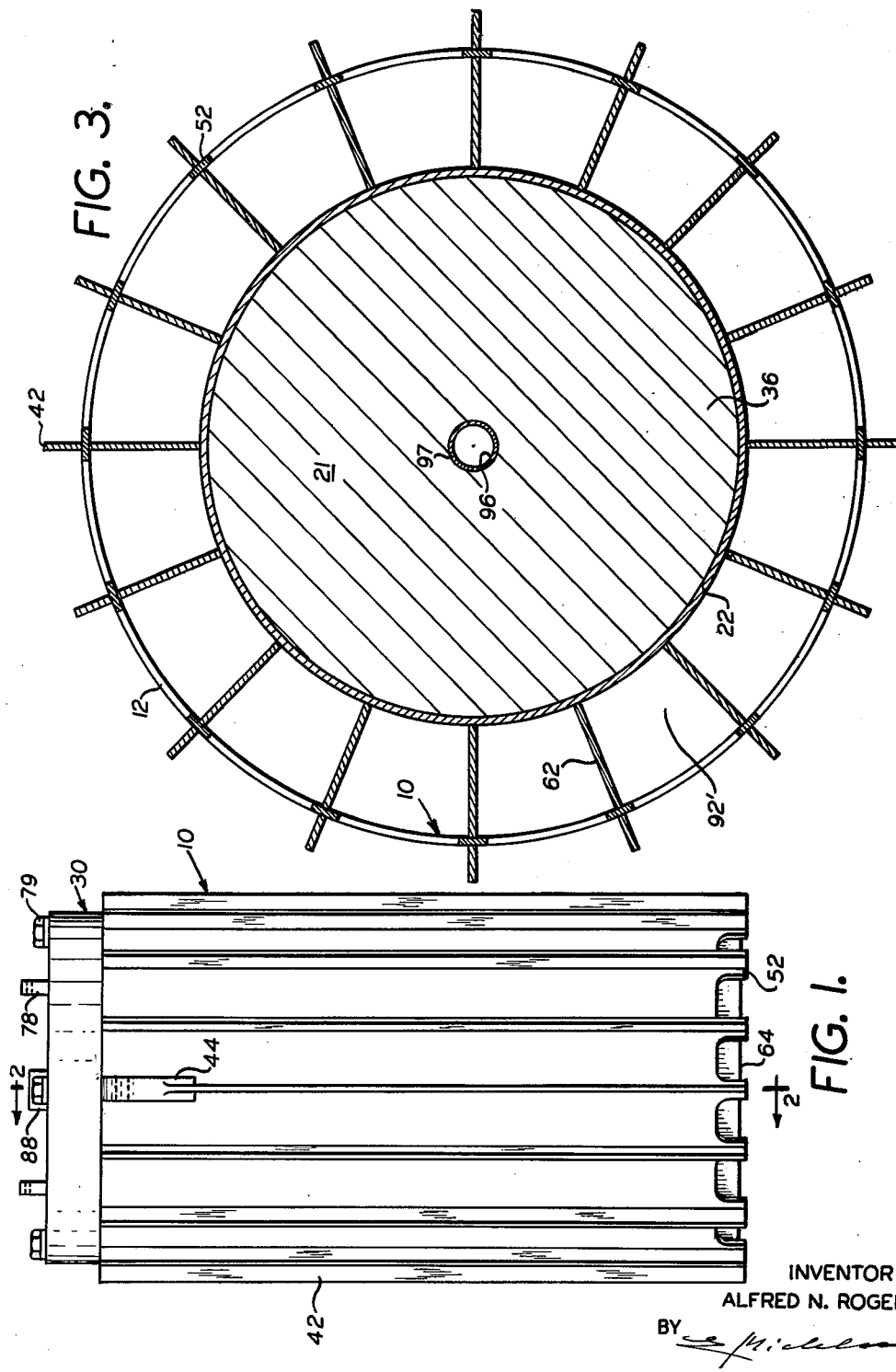

The vertically disposed shipping container or cask illustrated in the drawings comprises an outer, hollow cylindrical member or casing generally indicated at 10 which is provided with a shell 12 having an inner wall 14. The upright container 10 further comprises an inner, substantially cylindrical member or post generally indicated at 20 which has a bottom portion 21 thereon and a shell 22 forming a part of the post as well as of the bottom thereof. A removable top portion or cover generally indicated at 30 is provided with a shell 32 and serves to close the container. Each of the shells is in a well-known manner filled with a body of lead or other shielding material as shown at 34, 36 and 38, respectively. Preferably, all the shells are of welded construction and consist of stainless steel or the like, the bodies of lead being clad in this manner for ease of decontamination.

Shell 12 includes a ring 40 which closes the top of the shell and may be welded thereto. This ring is shaped to support the cover 30 and at the same time serves to reinforce the structure so that the rigidity thereof will be maintained when cover 30 is removed therefrom. Welded or otherwise secured to the outside of casing 10 are vertical cooling fins 42, and perforated lugs 44 for handling the cask. It should be noted that a relatively limited number of cooling fins are shown in the drawings for simplicity of illustration, a closer spacing being employed in practice to obtain the best possible cooling effect. In the region of its lower end, casing 10 is provided with an internal shoulder 46 and an outwardly flaring frusto-conical opening 48 terminating at a horizontal wall 50 of the casing. The outer wall of shell 12 has a plurality of downward extensions or legs 52 thereon to support the cask.

Figure 2:
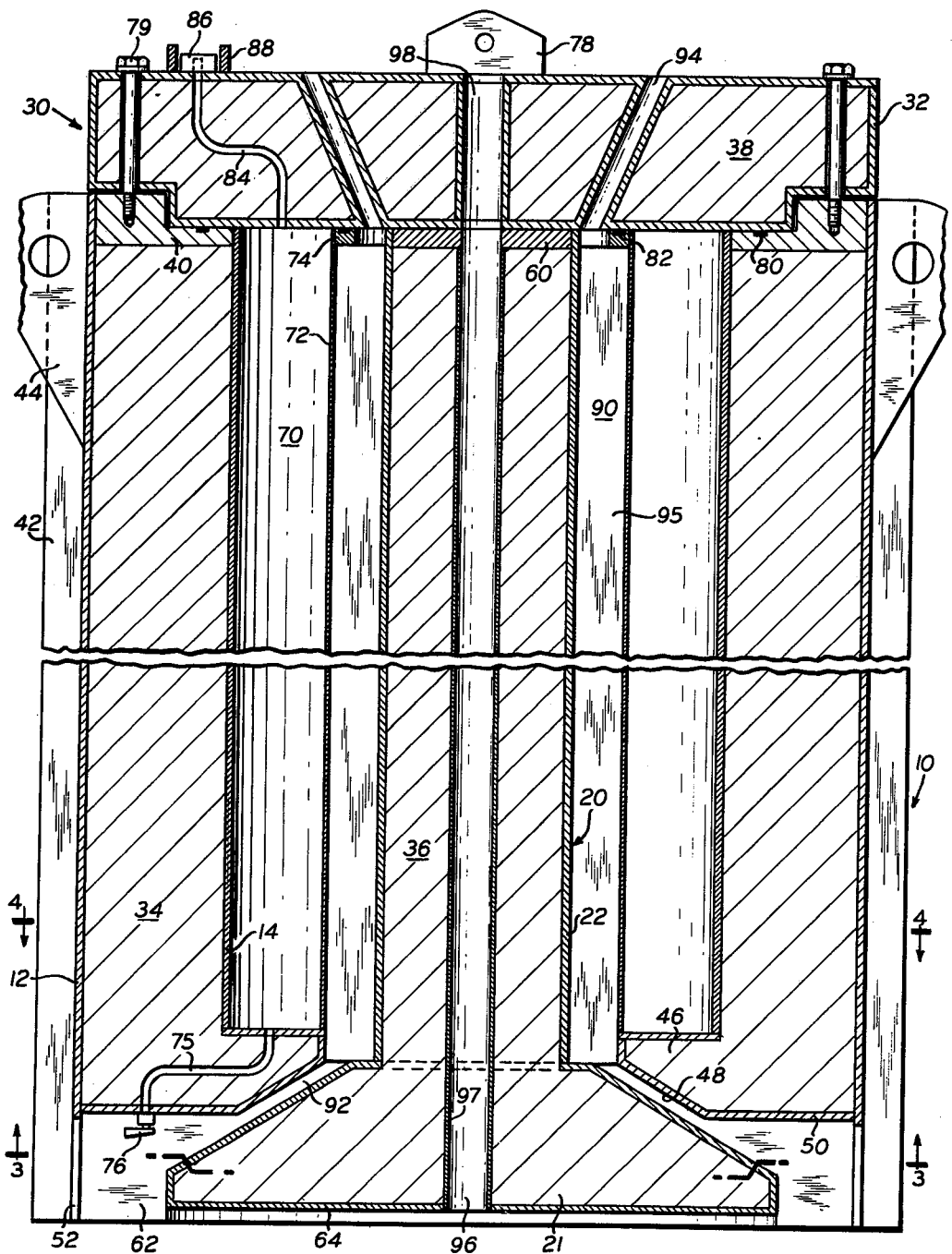
FIG. 2 is an enlarged, fragmentary section taken on line 2—2 of FIG. 1.

Referring now to the internal post 20 which extends through the hollow casing 10 in spaced relationship thereto, the upper end of shell 22 is provided with a ring 60 in a manner similar to that described in connection with ring 40 of shell 12. Bottom portion 21 of the post is generally in the form of a frusto-conical plug complementary to, but spaced from, the wall of the frusto-conical opening 48. The post 20 is secured to casing 10 by means of spaced, spider-like ribs 62, preferably of stainless steel, which are welded or otherwise rigidly fastened to the plug-shaped bottom portion 21 of the post as well as to the wall of opening 48, the end wall 50 and the legs 52 of shell 12. As shown in FIG. 2, the ribs may be dimensioned to reach down to the lower ends of legs 52 and thus project somewhat beyond wall 64 of bottom portion 21.

To form a fuel chamber or compartment 70 of annular cross section for receiving spent elements, an intermediate cylindrical wall 72 is positioned in the internal space between casing 10 and post 20. In the preferred embodiment, wall 72 consists of a relatively thin sheet of stainless steel and is welded to the internal shoulder 46 of casing 10, a reinforcing ring 74 being welded to the top of wall 72 so as to form a part thereof. A drain or flush opening 75 is provided at the lower end of chamber 70 and is controlled by a valve, plug, cap, or cock 76.

Cover 30 which has lifting lugs 78 thereon is removably attached to ring 40 of casing 10 by means of bolts 79. Sealing rings or labyrinth gaskets 80 and 82 are positioned in the rings 40 and 74, respectively, and are engaged by cover 30 when in position on the casing so that chamber 70 will be sealed against the escape of particulate matter therefrom. A vent opening 84 in the cover is arranged to communicate with chamber 70 intermediate the sealing means 80, 82 and is connected to an absolute filter 86 capable of absorbing particulate matter. The filter, diagrammatically shown in FIG. 2, is positioned between guard ribs 88 to protect it against damage by a crane hook or the like, the ribs being preferably welded to cover 30.

An air cooling channel 90 of annular cross section is formed between post 20 and wall 72 in a manner such that while chamber 70 is positioned along one side of wall 72, the cooling channel 90 extends along the other side thereof. The spaces between adjacent legs 52 and spider ribs 62 serve to form inlet passages 92 associated with the bottom portion 21, while outlet passages 94 are arranged in cover 30. Channel 90 is subdivided by vertical, auxiliary spider ribs 95 in the illustrated embodiment. The auxiliary ribs which are preferably made of stainless steel and connected to the intermediate wall 72 and shell 22 by welding, serve as cooling fins and at the same time reinforce the structure. As shown in the drawings, aligned holes 96, 98 may extend through post 20 including its bottom portion 21 and through the cover 30, respectively. Hole 96 is preferably formed by providing the shell 22 with an internal stainless steel tube 97, and the hole 98 is arranged in cover 30 in a similar manner. The holes which are spaced from channel 90 and its inlet and outlet passages 92, 94 provide an additional air passageway.

In operation, the cask when open will be immersed in a pool of water in which spent fuel elements removed from a nuclear reactor are accommodated while decaying partially. The cask will be loaded under water with such spent fuel elements, one of which is shown at 100 in FIG. 4. Each of the fuel elements is positioned in a clip-like member 102 of resilient material which is shaped to embrace the element partly and cause it to contact the intermediate wall 72 intimately for effective heat conduction, while at the same time serving to space adjacent elements from each other. It is desirable to make the clips from a material which is capable of absorbing neutrons so that chain reactions will not occur. For example, a cadmium or boron containing alloy such as boron stainless steel may be used for this purpose.

After elements 100 and their clips 102 have been inserted in chamber 70, the cover 30 will be secured to casing 10 under water, whereupon the cask will be raised above pool level and water will be permitted to drain from chamber 70 through cock 76 back to the pool. The cock is positioned in one of the passages 92 and easily accessible and after it has been closed, the container is ready for shipment by rail or other suitable means.

When decay heat is developed by the fuel elements, it will partly be transmitted to wall 72 and ribs 95 by conduction since the elements are held in abutting relationship with wall 72 and the ribs 95 are rigidly secured to the wall. Further, a certain amount of heat will be transferred to wall 72 by convection as the fuel elements are separated by the clips 102 to form spaces 104, which will facilitate internal circulation of air within the substantially closed chamber 70. It should be noted in this connection that the temperature of casing 10 may rise considerably under the influence of radioactive rays emitted from the decaying elements 100. This will be taken care of partly by the outer cooling fins 42, but to some extent the excess heat occurring in casing 10 will be transmitted to wall 72 by convection due to the internal circulation of air within chamber 70. Heat developed within post 20 under the influence of radioactive rays will be conducted to the peripheral wall of shell 22 and to ribs 95, as well as to the wall 97 of hole 96 if this optional hole is provided for.

As stated, wall 72 is relatively thin and in conjunction with the auxiliary spider ribs 95 will transmit heat very effectively to air in the cooling channel 90. Warm air will be caused to rise in the channel between ribs 95 and then pass through the outlet passages 94. This will result in a chimney effect with cooler ambient air being drawn in through the passages 92. A similar, additional stream of air will flow through the holes 96, 98 if post 20 is of the perforated type, and a certain amount of heat will also be dissipated by flow of air along the outer cooling fins 42. The heat balance during shipment should preferably be such that the temperature of the fuel elements will remain at least 100° F. below the rupture temperature of the elements. Most of the decay heat is normally dissipated by the circulation of air through channel 90 but if the cask lands on its side due to an accident, the outer fins 42 would have to carry the major share of the cooling load until the cask is in an upright position again. When the air in chamber 70 expands due to a rise in temperature, it is vented through the absolute filter 86 which will prevent egress of radioactive matter from the chamber.

At the disposal site, the container is suspended above a canal, and saturated steam is admitted to the fuel chamber 70 through cock 76 to cool the fuel elements directly. The steam is superheated upon contact with the hot fuel elements as long as their temperature is above 212° F., and is discharged to the atmosphere through the particulate filter 86, the air in chamber 70 being flushed therefrom. After the fuel temperature has dropped to 212° F., the cask is lowered to the bottom of the canal and cover 30 unbolted and lifted. Upon removal of the spent fuel elements 100, the cask is ready to be returned to the reactor site and loaded with spent elements again. The cask may remain empty during the return trip or its chamber 70 may be utilized to carry fresh elements to the reactor.

To obtain safe operation, it must be made certain that neither any radioactive matter nor any detrimental rays will escape from the container. The first-mentioned requirement is met by providing the sealing strips 80, 82 for chamber 70 and arranging the filter 86 at the vent opening 84, the bottom and sides of the chamber being of welded construction. The second requirement is taken care of generally by means of the shielding material indicated at 34, 36, 38 which should be of ample thickness, but special precaution is required where the material is perforated. In this connection, it should be borne in mind that radioactive rays are detrimental chiefly to objects positioned in their straight path, whereas when the rays are deflected they lose about ninety percent of their energy each time their direction is changed. For example, the energy left after three deflections will be on the order of only one-tenth of a percent of the original magnitude. To take advantage of this behavior, the drain opening 75 and the vent opening 84 follow a curved path in a well-known manner and the rays entering these openings will be deflected many times before escaping therefrom. However, the air inlet passages 92 and outlet passages 94 are preferably not curved in this way since it is desirable to keep the resistance to flow at a low level. Rather, these passages are inclined to the straight direction of any rays arriving from the fuel elements so that such rays will be deflected a plurality of times while traveling through the passages. In the embodiment shown, the desired result is obtained by the angular disposition of the passages 92, 94 which have their inner ends closest to post 20, in conjunction with the shielding effect of the internal shoulder 46 and the post. For example, any rays emitted from the fuel element 100 shown in FIG. 4, are excluded by the shielding material in shoulder 46 from direct access to passages 92 close to and underneath the element. Such rays are further prevented by the shielding material 36 of the post from directly reaching the air inlet passage 92' (FIG. 3) and similar passages at the opposite side of the container. As regards intermediate passages, any rays emitted from fuel element 100 will arrive at an angle such that they will be deflected a plurality of times by walls of the passages before escaping therefrom. Likewise, post 20 will have a corresponding effect with regard to the inclined air outlet passages 94 so that no harmful rays will reach areas outside the cask.

It will be apparent from the foregoing description that the chimney effect and natural convection flow employed in my device result in a very simple and effective cooling system, the tare weight of the equipment being relatively low. There is no danger of any detrimental loss of coolant since air is used exclusively as the medium. No moving members, driving means or appreciable maintenance are required for the operation of my cooling device. Therefore, it is safe to provide a drain connection at the bottom of the fuel compartment and remove water therefrom before shipment, whereas in conventional containers such connection at the bottom is avoided and the compartment is kept filled with water while the cask is transported to the disposal site. It will further be clear that my arrangement effectively solves the problem of shielding the container in spite of the provision of passages for the circulation of air. The shielding material and the walls defining the passages are disposed and formed so as to prevent the escape of any straight rays from the fuel elements to the outside. Since the fuel compartment is substantially sealed during transport and its vent opening connected to an absolute filter, any detrimental escape of particulate matter is likewise avoided.

As will be understood, the embodiment described does not represent all the ways in which the broad invention may be employed. For example, the fuel compartment 70 surrounds the cooling channel 90 in the embodiment shown as this renders it possible to accommodate a relatively large number of elements 100 within a container of selected size. If desired, however, the cooling channel may surround the fuel compartment, or the compartment may be flanked by a cooling channel at its inside and outside so that it is positioned therebetween. If additional flow of air through the holes 96, 98 is not necessary, a bolt may be inserted therein and fastened by means of a nut to cooperate with the bolts 79 in securing the parts during shipment. Further, the bottom portion of each clip 102 consisting of boron stainless steel or a cadmium containing alloy or the like may be in the form of an upwardly open container so that in case the fuel elements melt down due to overheating or a fire in the environment, the individual uranium bearing masses will be cut off from each other by a material capable of absorbing neutrons so as to prevent the occurrence of criticality. Instead of resting on legs such as shown at 52, the cask may be suspended from a shoulder welded to, and located near, the top with ambient air being allowed to enter the passages 92 freely from below. A wire guard fence may be provided around the cask so that its surface when uncomfortably hot will not be touched accidentally. Various other modifications and changes may be made without departing from the scope of my invention as defined in the appended claims.

What I claim is:

1. An upright shipping container for nuclear fuel elements, comprising a hollow outer member, an inner member extending through said hollow member in spaced relationship thereto, a bottom portion secured to said members and having air inlet passages associated therewith, a removable top portion secured at least to one of said members and having air outlet passages therein, wall means intermediate said spaced outer and inner members and cooperating with said outer member to form a chamber therewith for receiving said fuel elements, means for sealing said chamber to prevent the escape of particulate matter therefrom, said wall means being spaced from said inner member so as to form a cooling channel therewith communicating with said inlet and outlet passages for air circulation therethrough, and shielding material in said outer and inner members and top and bottom portions positioned to prevent direct radiation from any one of said fuel elements through said members and portions and their passages to areas outside said cask.

2. A vertically disposed shipping cask for spent nuclear fuel elements, comprising a substantially cylindrical casing, a substantially cylindrical internal post extending through said casing in spaced relationship thereto, a bottom on said post connected to said casing and having air inlet passages associated therewith, a removable cover secured to said cask and having air outlet passages therein, said casing, post, bottom and cover including shielding material disposed to prevent direct radiation from any one of said fuel elements to areas outside said cask, a substantially cylindrical intermediate wall positioned within the casing and secured thereto to form a substantially closed chamber with said casing for accommodating said fuel elements, and means for preventing egress of radioactive matter from said chamber, said intermediate wall being spaced from said post so as to form a cooling channel therewith communicating with said inlet and outlet passages, whereby upon the development of decay heat by said fuel elements air will be caused to flow upwardly through said inlet passages, channel and outlet passages to dissipate said heat by convection.

3. A shipping cask as specified in claim 2, including an internal shoulder in the casing near the lower end thereof for supporting the fuel elements and for shielding said elements in the downward direction, said intermediate wall being secured to said shoulder.

4. A shipping cask as specified in claim 2, in which said inlet and outlet passages are inclined with their inner ends being positioned closest to said post.

5. A shipping cask as specified in claim 2, in which said casing has an outwardly flaring frusto-conical opening at its lower end, and said bottom of the post is generally in the form of a complementary frusto-conical plug spaced from the wall of said frusto-conical openings, and in which said frusto-conical plug is secured to said wall of the frusto-conical opening by means of spaced spider-like ribs, the spaces between the ribs forming said air inlet passages.

6. A shipping cask as specified in claim 2, including a valve for controlling a curved drain and flush opening leading to the lower end of said chamber.

7. A shipping cask as specified in claim 2, including auxiliary, spider-like and vertically disposed ribs connected to said internal post and intermediate wall and subdividing said cooling channel.

8. A shipping cask as specified in claim 2, in which said means include seals arranged to engage the cover, intermediate wall and casing; and in which the cover has a curved vent opening therein communicating with said chamber intermediate said seals, and said vent opening is connected to a filter capable of absorbing particulate matter.

9. A shipping cask as specified in claim 2, including resilient, clip-like members in said substantially closed chamber, each of said clip-like members being shaped to partly embrace one of said fuel elements and cause it to contact said intermediate wall for heat conduction while at the same time spacing adjacent fuel elements from each other to facilitate internal circulation of air in said substantially closed chamber for transferring heat to walls of the chamber by convection.

10. A vertically disposed shipping cask for spent nuclear fuel elements, comprising a substantially cylindrical casing having generally vertical cooling fins on its outside, a substantially cylindrical internal post extending through said casing in spaced relationship thereto, a bottom on said post connected to said casing and having air inlet passages associated therewith, a removable cover secured to said cask and having air outlet passages therein, said casing, post, bottom and cover incluidng shielding material disposed to prevent direct radiation from any one of said fuel elements to areas outside said cask, a substantially cylindrical intermediate wall positioned within the casing and secured thereto to form an annular chamber with said casing for receiving said fuel elements, and means for preventing egress of particulate matter from said chamber, said intermediate wall being spaced from said post so as to form an annular cooling channel therewith communicating with said inlet and outlet passages, said post and its bottom having a generally vertical hole therethrough spaced from said inlet passages and channel, and said cover having a hole therethrough spaced from said outlet passages and aligned with said hole in the post and its bottom, whereby upon the development of decap heat by said fuel elements air will be caused to flow upwardly through said inlet passages, channel and outlet passages, through said aligned holes, and along said cooling fins to dissipate said heat by convection.

References Cited in the file of this patent

UNITED STATES PATENTS

| | | |
|---|---|---|
| 3,005,105 | Lusk | Oct. 17, 1961 |
| 3,038,999 | Loos et al. | June 12, 1962 |
| 3,046,403 | Montgomery | July 24, 1962 |

FOREIGN PATENTS

| | | |
|---|---|---|
| 835,947 | Great Britain | May 25, 1960 |